Patented Aug. 28, 1951

2,565,462

UNITED STATES PATENT OFFICE 2,565,462

CARBONYLATION OF AROMATIC HALIDES

William W. Prichard and Georges E. Tabet, Wilmington, Del., assignors to E. I. du Pont de Nemours & Company, Wilmington, Del., a corporation of Delaware No Drawing. Application May 28, 1949,
Serial No. 96,137

9 Claims. (Cl. 260—475)

This invention relates to an improved process for carbonylation of aryl halides, such as monochlorobenzene, dichlorobenzenes and related compounds. The specific improvement to which the present invention is directed relates to the use of certain modifiers, which have a beneficial effect upon the carbonylation reaction.

The term "carbonylation," as employed herein, means the introduction of C=O into an organic molecule.

The carbonylation of an aryl halide, e. g. dichlorobenzene, in the presence of an alcohol, e. g. methanol or ethylene glycol as a modifier, may be illustrated by the following equations:

(1)
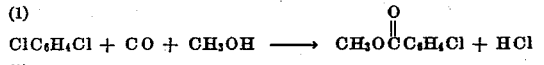

(2)
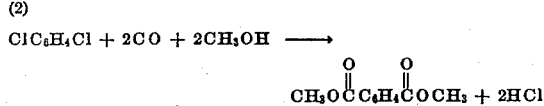

(3)
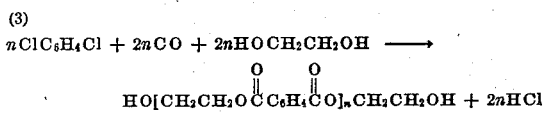

When the dichlorobenzene which is employed is para-dichlorobenzene the carbonylation product is terephthalic acid, or intermediates which, if desired, can be converted readily to terephthalic acid.

Carbonylation of organic halides in the presence of certain specific catalysts (generally of the Friedel-Crafts type) have been known heretofore (Thomas, Anhydrous Aluminum Chloride in Organic Chemistry, Reinhold Publishing Corp., New York, N. Y., 1941, page 767; Arch. Pharm. 265, 187-95 (1927); Anales soc. espan. fis. quim. 27, 663-7 (1929); German Patent 537,610; U. S. Patents 2,003,477, 2,053,233, 2,062,344, 2,378,048, 2,411,982; British Patents 547,101 and 581,278; copending application S. N. 14,384, filed September 1, 1948).

An object of the present invention is to provide an improved catalytic process for carbonylation of aryl halides. Other objects of the invention will appear hereinafter.

The present invention provides a novel method for carbonylation of aryl halides, by the use of nickel carbonyl or a similar metal carbonyl as an agent which assists or effects the carbonylation reaction, in the presence of a reactant which is capable of converting an acyl halide group (e. g.

to an ester group. Examples of such reactants are hydroxyalkanes, alkoxyalkanes, alkoxyhydroxyalkanes, cycloalkanols, cycloalkenols, alkenols, alkynols, and phenols.

Whether the metal carbonyl is considered as acting catalytically, or as an active carbon monoxide carrier, or as a reactant, or a substance which generates a transitory active agent, is not necessarily known, and such theoretical considerations are not intended to limit the invention in any way.

The aryl halide reactants, in general, contain chlorine, bromine or iodine attached directly to the aromatic nucleus. Such compounds include monochlorobenzene, o-dichlorobenzene, p-dichlorobenzene, chloronaphthalenes, chloroanthracenes, and the corresponding bromo and iodo compounds. Any organic compound capable of esterifying a

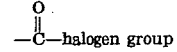

may be employed as a reactant in the practice of the invention. Suitable examples of such compounds are methanol, isopropanol, tertiary butanol, polyvinyl alcohol, ethylene glycol, allyl alcohol, cyclopentanol, dimethyl ether, diethyl ether, ethoxyethanol, phenol, toluol, beta-naphthol, etc. Compounds of the formula ROH in which R is a hydrocarbon group having from 1 to 6 carbon atoms are all highly effective.

Inorganic acids, such as aqueous hydrochloric acid or other aqueous mineral acids, may be present in the reaction mixture if desired.

The metal carbonyl which may be employed in the process of the invention are carbonyls of metals which are members of the iron sub-group, namely, iron, nickel and cobalt. It is not essential that these carbonyls be present in the reaction mixture initially since they are also effective when produced in situ.

It is usually desirable to employ at least about one mol of metal carbonyl per equivalent of the C-halogen group reacting. In a continuous process this can be accomplished by continuously replenishing the metal carbonyl to make up for any losses caused by reaction or by thermal decomposition; thus, if the process is operated continuously, the quantity of metal carbonyl which is introduced or which may be generated per unit of reaction time should be preferably at least one mol per mol of C-halogen group reacting. In batchwise operation it is preferable to employ initially at least one equivalent (0.25 mol) of metal carbonyl per equivalent of C-halogen group reacting. This, of course, is not intended to imply that an excess of the organic halide cannot be present, but rather that the number of equivalents of C-halogen group undergoing reaction may be limited by the number of available equivalents of metal carbonyl. Reaction mixtures containing from 0.25 to 2.5 mols of metal carbonyl per equivalent of C-halogen give the best results.

The carbonylation of aryl halides in accordance with this invention takes place relatively slowly at temperatures below about 200° C. It is therefore generally preferred to carry out the reaction at a temperature within the range of about 250° to 350° C. Best results are obtained when superatmospheric pressures are employed, preferably pressures within the range of about 200 to 1500 atmospheres.

Any convenient or suitable apparatus may be used in the carbonylation of aryl halides according to the process of this invention. In batchwise operation pressure-resistant autoclaves made of or lined with relatively inert metals, such as stainless steel, silver, copper, etc., may be employed advantageously. In continuous operation tubular reaction vessels may be employed and, if desired, the reactants may be introduced at more than one point along the tubular reaction vessel. Similarly the metal carbonyl, or a substance which produces metal carbonyl under the reaction conditions, may be injected at one or more points along a tubular reaction vessel, if desired.

Any suitable method may be employed for separating the carbonylation products from the reaction mixture obtained in the practice of the invention. The carboxylic esters in general can be separated from the reaction mixture by simple distillation. For reasons of economy, it is frequently desirable to convert all of the nickel, or other similar metal, in the reaction product to metal carbonyl and to recover the said metal carbonyl and recycle the same along with additional quantities of aryl chloride.

Carbon monoxide is usually, but not necessarily, present in the reaction mixture. It should be understood that the introduction of carbon monoxide from an external source is not always desirable, since the carbon monoxide which is combined with the metal carbonyl is also effective in the carbonylation reaction. Hydrogen may be present, and in some instances it exerts a beneficial effect by assisting in the conversion of metal salts to metal carbonyls.

The invention is illustrated further by means of the following examples.

Example 1.—A mixture consisting of 26 grams para-chlorotoluene (0.2 mol), 19 grams phenol (0.2 mol), 100 cc. benzene, and 35 grams of cobalt acetate was heated in a stainless steel reaction vessel at a temperature of 298° to 306° C. for sixty-five minutes under a pressure of 800 to 860 atmospheres with a mixture of carbon monoxide and hydrogen in which the mol ratio of CO:H was 1:1 initially. The resulting mixture was withdrawn from the reaction vessel; the benzene layer was separated, shaken with potassium carbonate and distilled. After removal of unreacted para-chlorotoluene and phenol, 4.5 grams of a heel containing high-boiling ester (phenyl-p-toluate) was obtained.

Example 2.—A mixture consisting of 26 grams para-chlorotoluene (0.2 mol), 36 grams nickel carbonyl (0.2 mol), and 100 grams phenol was heated in a stainless steel reaction vessel at a temperature of 300° to 314° C. for two hours in the absence of added carbon monoxide. The liquid product, 110.5 grams, was withdrawn from the reaction vessel. The vessel was then washed with 125 cc. of benzene, and the benzene washes were combined with the reaction product. The resulting mixture was filtered to remove elemental nickel, and was thereafter shaken with potassium carbonate, and distilled. Nineteen and nine-tenths grams of a phenyl-p-toluate fraction (B. P., 146° C./2 mm.; saponification equivalent, found 214, theory, 212) was obtained.

Example 3.—A mixture consisting of 17 grams nickel carbonyl (0.1 mol), 30 grams para-dichlorobenzene (0.205 mol), and 70 grams methanol (2 mols) was heated with carbon monoxide in a silver-lined reaction vessel at a temperature of 300° C. for 9.75 hours (pressure, 280 atmospheres). The resulting product was extracted with chloroform leaving 9 grams of insoluble solid which was filtered off. The filtrate consisted of two layers; the upper aqueous layer which contained dissolved nickel salt weighed 14.2 grams; the chloroform layer, upon concentration, gave a crop of crystals, M. P., 135° to 137° C., which were identified as dimethyl terephthalate (12.1 grams). A second crop of these crystals (1.4 grams) was obtained upon further concentration. The chloroform-insoluble solid was extracted with alkali and the resulting solution was thereafter acidified, whereby 6.8 grams of terephthalic acid was obtained. The overall conversion of dichlorobenzene to terephthalic acid and ester was 55.3% of the amount theoretically obtainable. A similar result is obtained using p-dibromobenzene in place of p-dichlorobenzene.

Example 4.—A mixture consisting of 26 grams para-chlorotoluene (0.2 mol), 36 grams nickel carbonyl (0.2 mol), and 100 cc. methanol (2 mols) was heated in a stainless steel reaction vessel at a temperature of 300° to 310° C. for two hours. The resulting product was removed from the reaction vessel; the interior of the vessel was then washed with benzene, and the benzene-washed liquor was combined with the reaction product. This mixture was filtered for removal of elemental nickel. Distillation of the resulting product gave 13.3 grams of methyl-p-toluate and 6.4 grams of a higher boiling product which crystallized upon standing. The crystals were taken up in alkali, and the resulting solution was acidified; this caused the formation of 4.5 grams of p-toluic acid.

Example 5.—A 400 cc., silver-lined reaction vessel was charged with 45 grams (0.4 mol) chlorobenzene, 17 grams (0.1 mol) nickel carbonyl, 75 grams (1.0 mol) diethyl ether and 0.5 gram iodine. The vessel was closed, pressured to 100 atmospheres with carbon monoxide, and heated with agitation to 250° C. for 4 hours. The product consisted of 113.8 grams of solid and liquid. The solid, which was removed by filtration, weighed 10 grams and was inorganic. The ethereal filtrate was distilled. After removal of the unreacted ether, a fraction boiling at 30° to 32° C./24 mm., which weighed 16 grams, was identified as recovered chlorobenzene. A second fraction distilled at 50° to 51° C./1 mm. and weighed 7.7 grams. This was identified as ethyl benzoate, by refractive index, $n_D^{25}$ 1.5040 and boiling point, 207°/758 mm. (The literature reports $n_D^{18.7}$ 1.5057 and B. P. 211°.) This is a conversion of 12.8% and a yield of 19.8% of ester.

*Example 6.*—A 400 cc., silver-lined reaction vessel was charged with 17 grams (0.1 mol) nickel carbonyl, 30 grams (0.204 mol) p-dichlorobenzene, and 100 grams (1.35 mol) diethyl ether. The vessel was pressured to 100 atmospheres with carbon monoxide, agitated, heated to 300° C., and maintained at this temperature for 8 hours. The semi-solid product recovered was extracted with chloroform, leaving an insoluble fraction, 16.5 grams, containing the catalyst decomposition products. The chloroform extract was concentrated and distilled. A fraction distilling at 80° C./2 mm., 18 grams, was identified as ethyl p-chlorobenzoate and represents a conversion of 47.8% based on the p-dichlorobenzene charged. Identification was based on the boiling point, 230° C. uncorrected, and the melting point of the acid obtained by saponification, 230° C. The corresponding constants for ethyl p-chlorobenzoate and p-chlorobenzoic acid are 238° and 235° C., respectively. A second fraction, 5 grams, which distilled at 120° C./1 mm. was identified as diethyl terephthalate and represents an 11% conversion of the p-dichlorobenzene. Identification was based on the melting point, 35° to 37° C. after crystallization from alcohol (reported for diethyl terephthalate 43.2° C.), and saponification to terephthalic acid.

*Example 7.*—A mixture consisting of 26 grams p-chlorotoluene, 36 grams nickel carbonyl and 102 grams of hexyl alcohol was heated at 300° to 312° C. for 2 hours under an autogenous pressure of about 300 atmospheres. The product, as withdrawn from the reaction vessel, weighed 122.4 grams. The reaction vessel was washed with benzene and the benzene washes (100 cc.) were combined with the reaction product. This mixture was distilled, yielding a benzene fraction, 2.8 grams of recovered p-chlorotoluene, and 24.6 grams of dihexyl ether, and 33 grams of a fraction which was a mixture of p-toluic acid and hexyl p-toluate.

*Example 8.*—A mixture consisting of 26 grams p-chlorotoluene, 25 grams benzene, 40 grams iron carbonyl, and 32 grams of methanol, heated at autogenous pressure at 300° C. in a closed vessel gives methyl p-toluate as the chief reaction product.

*Example 9.*—A mixture consisting of 26 grams p-chlorotoluene, 36 grams of nickel carbonyl and 100 cc. of ethylene glycol was heated for 2 hours at 290° to 310° C. The weight of product withdrawn from the reaction vessel was 81.6 grams. The vessel was washed with 150 cc. benzene, and 50 cc. methanol, after which the washes were combined with the reaction product and liquid thus obtained was distilled. This gave an acidic distillate which evidently was derived from the ethylene glycol, and also a distillation heel which weighed 28.9 grams. The heel was a mixture of p-toluic acid and glycol ester thereof.

It is to be understood that the foregoing examples are illustrative only and that they are not intended to limit the scope of the invention in any way. Numerous methods for modifying the illustrated procedure will be apparent to those who are skilled in the art. For example, the corresponding bromo and iodo compounds can be employed in place of the chloro compounds illustrated in the examples. Alkaline acceptors for the hydrogen chloride which may be generated when the carbonylation is carried out in an aqueous system may be introduced if desired, and in this manner the pH of the reaction mixture can be kept within desirable limits. The unreacted aryl halide may, of course, be recovered and recycled. This is true also of the intermediate reaction products, such as the monochlorobenzoic acids. It is our intention that such changes and modifications to the extent that they are within the scope of the appended claims shall be considered as part of our invention.

We claim:

1. The method for carbonylation of compounds having a halogen atom of the class consisting of chlorine, bromine and iodine attached to an aromatic hydrocarbon nucleus which comprises carrying out the said carbonylation reaction at elevated temperatures and superatmospheric pressures in the presence of a carbonyl of a metal of the iron sub-group and in the presence also of an organic reactant which is capable of converting an acyl halide group to an ester group, said organic reactant being a member of the class consisting of alcohols, alkoxyalkanes and phenols.

2. The method for carbonylation of aryl chlorides having —Cl attached directly to an aromatic hydrocarbon nucleus which comprises carrying out the said carbonylation reaction at elevated temperatures and superatmospheric pressures in the presence of nickel carbonyl and a compound of the formula ROH, wherein R is a hydrocarbon radical having from 1 to 6 carbon atoms, and separating from the resulting mixture the ester produced by the said carbonylation reaction.

3. The method of claim 2, in which the said aryl chloride is para-dichlorobenzene.

4. The method of claim 2, in which the said aryl chloride is para-chlorotoluene.

5. The method of claim 2, in which the said aryl chloride is monochlorobenzene.

6. In a process for carbonylation of para-dichlorobenzene the step which comprises introducing nickel tetracarbonyl, para-dichlorobenzene, carbon monoxide and a hydroxyalkane having from 1 to 6 carbon atoms per molecule into a reaction vessel, heating the resulting mixture at a temperature of 250° to 350° C. under a pressure within the range of 200 to 1500 atmospheres, whereby an ester of terephthalic acid is produced, and thereafter separating the said ester from the reaction mixture.

7. In a process for carbonylation of para-dichlorobenzene the step which comprises heating nickel tetracarbonyl, para-dichlorobenzene, methanol and carbon monoxide at a temperature of 250° to 350° C. under a pressure within the range of 200 to 1500 atmospheres, whereby methyl terephthalate is produced, and thereafter separating methyl terephthalate from the resulting mixture.

8. In a process for carbonylation of para-dichlorobenzene the step which comprises heating nickel tetracarbonyl, para-dichlorobenzene, and a dialkyl ether having from 2 to 8 carbon atoms per molecule with carbon monoxide at a temperature of 250° to 350° C. under a pressure within the range of 200 to 1500 atmospheres, whereby an alkyl ester of terephthalic acid is produced, and thereafter separating the said ester from the resulting reaction product.

9. In a process for carbonylation of para-dichlorobenzene the step which comprises heating nickel tetracarbonyl, para-dichlorobenzene, and a dialkyl ether having from 2 to 8 carbon atoms per molecule with carbon monoxide at a temperature of 250° to 350° C. under a pressure within the range of 200 to 1500 atmospheres, the quantity of nickel tetracarbonyl being from 0.25 to 2.5 mols per equivalent of C—Cl in the said para-dichlorobenzene, whereby an alkyl ester of terephthalic acid is produced, and thereafter separating the said ester from the resulting reaction mixture.

WILLIAM W. PRICHARD.
GEORGES E. TABET.

REFERENCES CITED

The following references are of record in the file of this patent:

UNITED STATES PATENTS

| Number | Name | Date |
|---|---|---|
| 2,003,477 | Woodhouse | June 4, 1935 |
| 2,053,233 | Woodhouse | Sept. 1, 1936 |
| 2,448,368 | Gresham | Aug. 31, 1948 |
| 2,457,204 | Brooks | Dec. 28, 1948 |

FOREIGN PATENTS

| Number | Country | Date |
|---|---|---|
| 502,673 | France | May 22, 1920 |

OTHER REFERENCES

Fiat Final Report No. 273 (October 2, 1945), interview with Dr. W. J. Reppe (I. G. Farbenindustrie, A. G.) by Peck and Jones, Office of Military Government for Germany, U. S.), Office of Director of Intelligence, pages 9 to 18.

Advances in Acetylene Chem. as Developed by Walter Reppe, Director of Organic Research, I. G. Farbenindustrie, A. G., Intelligence Division Report No. 4149 (March 24, 1945), pages 20–30.